(12) United States Patent
Rice et al.

(10) Patent No.: US 10,415,415 B2
(45) Date of Patent: Sep. 17, 2019

(54) TURBINE SHROUD WITH FORWARD CASE AND FULL HOOP BLADE TRACK

(71) Applicant: Rolls-Royce North American Technologies, Inc., Indianapolis, IN (US)

(72) Inventors: Edward C Rice, Indianapolis, IN (US); Daniel K Vetters, Indianapolis, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 767 days.

(21) Appl. No.: 15/217,305

(22) Filed: Jul. 22, 2016

(65) Prior Publication Data

US 2018/0023408 A1    Jan. 25, 2018

(51) Int. Cl.
  *F01D 11/08* (2006.01)
  *F01D 25/00* (2006.01)
  *F01D 25/24* (2006.01)

(52) U.S. Cl.
  CPC ............ *F01D 11/08* (2013.01); *F01D 25/005* (2013.01); *F01D 25/24* (2013.01); *F05D 2220/32* (2013.01); *F05D 2230/60* (2013.01); *F05D 2230/642* (2013.01); *F05D 2240/11* (2013.01); *F05D 2240/12* (2013.01); *F05D 2240/14* (2013.01); *F05D 2260/36* (2013.01); *F05D 2300/6033* (2013.01); *Y02T 50/672* (2013.01)

(58) Field of Classification Search
  CPC combination set(s) only.
  See application file for complete search history.

(56) References Cited

U.S. PATENT DOCUMENTS

| | | |
|---|---|---|
| 3,601,414 A | 8/1971 | Rao |
| 4,087,199 A | 5/1978 | Hemsworth et al. |
| 4,477,086 A | 10/1984 | Feder et al. |
| 4,646,810 A | 3/1987 | Lardellier |
| 4,679,981 A | 7/1987 | Guibert et al. |
| 4,863,345 A | 9/1989 | Thompson et al. |
| 5,163,809 A | 11/1992 | Akgun et al. |

(Continued)

FOREIGN PATENT DOCUMENTS

| | | |
|---|---|---|
| DE | 102008044450 A1 | 2/2009 |
| EP | 1965030 A2 | 9/2008 |

(Continued)

OTHER PUBLICATIONS

Extended European Search Report, European Application No. 17167781.8-1610, dated Oct. 25, 2017, 8 pages.

(Continued)

*Primary Examiner* — Ninh H. Nguyen
*Assistant Examiner* — Maxime M Adjagbe
(74) *Attorney, Agent, or Firm* — Barnes & Thornburg LLP (57) ABSTRACT

A gas turbine engine includes a turbine shroud assembly arranged around a turbine wheel assembly. The turbine shroud assembly includes an annular turbine case, a blade track, and a forward case. The turbine case is arranged around a central axis of the turbine assembly. The blade track is located radially between the turbine case and the central axis. The forward case is coupled to the turbine case and is arranged to block axial movement of the blade track relative to the turbine case.

18 Claims, 4 Drawing Sheets

(56) References Cited

U.S. PATENT DOCUMENTS

| | | | |
|---|---|---|---|
| 5,738,490 A | 4/1998 | Pizzi | |
| 6,142,731 A | 11/2000 | Dewis et al. | |
| 6,315,519 B1 | 11/2001 | Bagepalli et al. | |
| 6,517,313 B2 | 2/2003 | Rogers | |
| 6,726,448 B2 | 4/2004 | McGrath et al. | |
| 6,733,233 B2 | 5/2004 | Jasklowski et al. | |
| 6,758,386 B2 | 7/2004 | Marshall et al. | |
| 6,758,653 B2 | 7/2004 | Morrison | |
| 6,896,483 B2 | 5/2005 | Dierksmeier et al. | |
| 6,910,853 B2 | 6/2005 | Corman et al. | |
| 7,090,459 B2 | 8/2006 | Bhate et al. | |
| 7,195,452 B2 | 3/2007 | Allan et al. | |
| 7,217,089 B2 | 5/2007 | Durocher et al. | |
| 7,234,306 B2 | 6/2007 | Aumont et al. | |
| 7,374,396 B2 | 5/2008 | Martin et al. | |
| 7,435,049 B2 | 10/2008 | Ghasripoor et al. | |
| 7,641,442 B2 | 1/2010 | Denece et al. | |
| 7,665,960 B2 * | 2/2010 | Shi | F01D 11/24 415/116 |
| 7,771,160 B2 | 8/2010 | Shi et al. | |
| 7,914,256 B2 | 3/2011 | Xie et al. | |
| 7,988,395 B2 | 8/2011 | Steffier | |
| 8,047,773 B2 | 11/2011 | Bruce et al. | |
| 8,061,977 B2 | 11/2011 | Keller et al. | |
| 8,079,807 B2 | 12/2011 | Shapiro et al. | |
| 8,092,160 B2 | 1/2012 | Shi et al. | |
| 8,167,546 B2 | 5/2012 | Shi et al. | |
| 8,235,670 B2 | 8/2012 | Morrison et al. | |
| 8,257,029 B2 | 9/2012 | Habarou et al. | |
| 8,322,983 B2 | 12/2012 | Marini | |
| 8,328,505 B2 | 12/2012 | Shi et al. | |
| 8,496,431 B2 | 7/2013 | Habarou et al. | |
| 8,511,975 B2 | 8/2013 | Shi et al. | |
| 8,555,647 B2 | 10/2013 | Dimascio et al. | |
| 8,568,091 B2 | 10/2013 | McCaffrey | |
| 8,651,497 B2 | 2/2014 | Tholen et al. | |
| 8,684,689 B2 | 4/2014 | Guo et al. | |
| 8,739,547 B2 | 6/2014 | Jarmon et al. | |
| 8,740,552 B2 | 6/2014 | Marusko et al. | |
| 8,770,931 B2 | 7/2014 | Alvanos et al. | |
| 8,784,052 B2 | 7/2014 | Shi et al. | |
| 8,790,067 B2 | 7/2014 | McCaffrey et al. | |
| 8,801,372 B2 | 8/2014 | Shi et al. | |
| 8,814,173 B2 | 8/2014 | Motzkus et al. | |
| 8,834,106 B2 | 9/2014 | Luczak | |
| 8,926,270 B2 | 1/2015 | Karafillis et al. | |
| 9,011,079 B2 | 4/2015 | Coign et al. | |
| 2004/0047726 A1 | 3/2004 | Morrison | |
| 2005/0123389 A1 | 6/2005 | Morris et al. | |
| 2009/0208322 A1 | 8/2009 | McCaffrey | |
| 2010/0111678 A1 | 5/2010 | Habarou et al. | |
| 2010/0150703 A1 | 6/2010 | Gonzalez et al. | |
| 2010/0232941 A1 | 9/2010 | Smoke et al. | |
| 2011/0052384 A1 | 3/2011 | Shi et al. | |
| 2011/0057394 A1 | 3/2011 | Halling | |
| 2011/0150635 A1 | 6/2011 | Motzkus et al. | |
| 2011/0274538 A1 | 11/2011 | Shi et al. | |
| 2012/0070276 A1 | 3/2012 | Shi et al. | |
| 2012/0107107 A1 | 5/2012 | Chan et al. | |
| 2012/0156029 A1 | 6/2012 | Karafillis et al. | |
| 2012/0177488 A1 | 7/2012 | Corman | |
| 2012/0247124 A1 | 10/2012 | Shapiro et al. | |
| 2012/0263582 A1 | 10/2012 | Foster et al. | |
| 2012/0301269 A1 | 11/2012 | Alvanos et al. | |
| 2012/0301312 A1 | 11/2012 | Berczik et al. | |
| 2012/0301303 A1 | 12/2012 | Alvanos et al. | |
| 2012/0308367 A1 | 12/2012 | Luczak | |
| 2013/0008176 A1 | 1/2013 | Shi et al. | |
| 2013/0011248 A1 | 1/2013 | Croteau et al. | |
| 2013/0177384 A1 | 7/2013 | Coign et al. | |
| 2013/0177411 A1 | 7/2013 | Weber et al. | |
| 2014/0202168 A1 | 7/2014 | Shapiro et al. | |
| 2014/0260320 A1 | 9/2014 | Graves et al. | |
| 2014/0271144 A1 | 9/2014 | Landwehr et al. | |
| 2014/0341707 A1 | 11/2014 | Jones et al. | |
| 2014/0341711 A1 | 11/2014 | Taylor et al. | |
| 2015/0044044 A1 | 2/2015 | Sippel et al. | |
| 2016/0123171 A1 | 5/2016 | Westphal et al. | |
| 2016/0177786 A1 | 6/2016 | Sippel et al. | |
| 2016/0208635 A1 | 7/2016 | Vetters et al. | |
| 2016/0222812 A1 | 8/2016 | Sippel et al. | |

FOREIGN PATENT DOCUMENTS

| | | |
|---|---|---|
| EP | 2299061 A2 | 3/2011 |
| EP | 2589774 A1 | 5/2013 |
| EP | 2604805 A2 | 6/2013 |
| EP | 2690257 A2 | 1/2014 |
| FR | 2580033 A1 | 10/1986 |
| FR | 2980235 B1 | 4/2015 |
| GB | 2235730 A | 3/1991 |
| GB | 2468768 A | 9/2010 |
| GB | 2480766 A | 11/2011 |
| JP | 09250304 A | 9/1997 |
| JP | 09264104 A | 10/1997 |
| WO | 2010058137 A1 | 5/2010 |
| WO | 2011157956 A1 | 12/2011 |
| WO | 2014120334 A1 | 8/2014 |
| WO | 2014143225 A1 | 9/2014 |
| WO | 2014163674 A1 | 10/2014 |

OTHER PUBLICATIONS

Extended EP Search Report dated Jan. 26, 2018 and issued in connection with EP Patent Appln. No. 17167778.4.

Corman, Gregory S. and Luthra, Krishan L.; Melt Infiltrated Ceramic Composites (HIPERCOMP®) for Gas Turbine Engine Applications; DOE/CE/41000-3; May 1994-Sep. 2005; pp. 1-507.

Bloxer, Matt L.; Thermal Stress in High Temperature Cylindrical Fasteners; NASA Technical Memorandum; May 1988; pp. 1-12.

Bloxer, Matt L. and McWithey, Robert R.; Theoretical Basis for Design of Thermal-Stress-Free Fasteners; NASA Technical Paper; Dec. 1983; pp. 1-26.

* cited by examiner

TURBINE SHROUD WITH FORWARD CASE AND FULL HOOP BLADE TRACK

FIELD OF THE DISCLOSURE

The present disclosure relates generally to gas turbine engines, and more specifically to turbine shrouds for turbine sections used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products.

SUMMARY

The present disclosure may comprise one or more of the following features and combinations thereof.

A turbine shroud assembly for a gas turbine engine may include an annular turbine case, a full hoop blade track, and a forward case. The annular turbine case may be arranged around a central axis of the turbine shroud assembly. The full hoop blade track may comprise ceramic matrix composite materials located radially between the turbine case and the central axis. The blade track may have a leading edge and a trailing edge axially spaced apart from the leading edge. The forward case may be coupled to the turbine case and arranged to extend radially inwardly away from the turbine case toward the central axis and may be interlocked with the leading edge of the blade track to block circumferential and axial movement of the blade track relative to the turbine case while allowing radial movement of the blade track relative to the turbine case.

In some embodiments, the forward case may include an axial runner that extends from a first end to a second end axially spaced from the first end and a locator flange coupled to the axial runner toward the second end. The locator flange may extend radially inwardly away from the turbine case toward the central axis. The locator flange may interlock with the leading edge of the blade track.

In some embodiments, the locator flange may be formed to include a plurality of cutouts that extend radially outwardly into the locator flange. The leading edge of the blade track may be formed to include a plurality of tangs that extend axially forward away from the trailing edge of the blade track toward the locator flange. Each tang may be received by one of the cutouts formed in the locator flange of the forward case to interlock the forward case and the blade track.

In some embodiments, the blade track may include a radial outer surface that faces the turbine case and a radial inner surface radially spaced apart from the radial outer surface. The radial outer surface of the blade track may be generally cylindrical without protrusions and depressions.

In some embodiments, the locator flange may be formed to include at least three cutouts. The leading edge of the blade track may be formed to include at least three tangs. In some embodiments, the axial runner may be formed to define a plurality of apertures that extends radially through the axial runner.

In some embodiments, the forward case may include a first end, a second end axially spaced apart from the first end, an axial runner that extends between the first and second ends, and a locator flange that extends radially inwardly away from the axial runner toward the central axis. The axial runner may include a band, a mount flange, and a shoulder. The band may extend between the first and second ends of the forward case. The mount flange may extend radially outwardly away from the band at the first end of the forward case. The shoulder may extend radially outwardly away from the band at the second end of the forward case.

In some embodiments, the turbine case may include a forward mount and an aft mount spaced apart axially from the forward mount. The aft mount may include a radial inner surface that faces the central axis. The shoulder of the axial runner may have an outer diameter that is larger than an inner diameter of the radial inner surface of the aft mount. In some embodiments, the shoulder may be formed to include radially extending scallops arranged to allow air flow between the shoulder and the turbine case.

In some embodiments, the turbine shroud assembly may further include a carrier and a hollow cross-key pin. The carrier may be located radially between the turbine case and the blade track. The hollow cross-key pin may extend through the turbine case into the carrier. The carrier may be arranged to define an inwardly facing thermal management chamber. The hollow cross-key pin may be configured to direct airflow through the turbine case and the carrier into the thermal management chamber toward the blade track.

According to another aspect of the present disclosure, a turbine assembly for a gas turbine engine may include an annular turbine case, a blade track, a vane assembly, and a forward case. The annular turbine case may be arranged around a central axis of the turbine assembly. The blade track may be located radially between the turbine case and the central axis. The blade track may have a leading edge and a trailing edge axially spaced apart from the leading edge. The vane assembly may be located radially between the turbine case and the central axis and located axially aft of the blade track. The vane assembly may be arranged to engage the trailing edge of the blade track to block axially aft movement of the blade track relative to the turbine case. The forward case may be coupled to the turbine case and arranged to interlock with the leading edge of the blade track to block circumferential and forward axial movement of the blade track relative to the turbine case while allowing radial movement of the blade track relative to the central axis.

In some embodiments, the forward case may include an axial runner that extends from a first end to a second end axially spaced from the first end and a locator flange coupled to the axial runner toward the second end. The locator flange may extend radially inwardly away from the turbine case toward the central axis. The locator flange may be formed to include a cutout that extends radially outwardly into the locator flange. The leading edge of the blade track may be formed to include a tang that extends axially into the cutout to interlock the forward case and the blade track.

In some embodiments, the axial runner may include a band and a mount flange that extends radially outwardly away from the band. The band may be formed to include a plurality of radially extending apertures spaced apart from one another circumferentially about the central axis.

In some embodiments, the turbine case may include a radially inwardly extending aft mount. The axial runner may include an annular band that extends from a first end to a second end of the band, a mount flange that extends radially outwardly away from first end of the band, and a shoulder that extends radially outwardly away from the second end of the band. The shoulder may engage the aft mount of the turbine case.

In some embodiments, the turbine assembly may further include nozzle guide vanes. The nozzle guide vanes may be located radially between the turbine case and the central axis and located axially forward of the blade track. The nozzle guide vanes may engage the forward case to transmit axial loads through the forward case. In some embodiments, the shoulder is discontinuous.

In some embodiments, the turbine assembly may further include a carrier located radially between the turbine case and the blade track and a hollow cross-key pin that extends through the turbine case into the carrier. The carrier may be arranged to define an inwardly facing thermal management chamber. The hollow cross-key pin may be configured to direct airflow through the turbine case and the carrier into the thermal management chamber toward the blade track.

According to another aspect of the present disclosure, a method of assembling a turbine assembly may include a number of steps. The method may include, providing an annular turbine case arranged around a central axis of the turbine case, a full hoop blade track having a leading edge and a trailing edge axially spaced apart from the leading edge, and a forward case having an axially extending axial runner and a radially inwardly extending locator flange, fastening the axial runner of the forward case to the turbine case, and interlocking the leading edge of a blade track with the locator flange of the forward case.

In some embodiments, the method may further include press-fitting the axial runner of the forward case to the turbine case. In some embodiments, the locator flange may be formed to include a cutout and the leading edge of the blade track may be formed to include a tang that extends axially away from the trailing edge of the blade track toward the forward case. The step of interlocking the leading edge of the blade track with the locator flange of the forward case may include the steps of aligning circumferentially the tang of the blade track with the cutout formed in the locator flange and moving the blade track axially toward the locator flange to cause the cutout to receive the tang.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figures 1, 2:
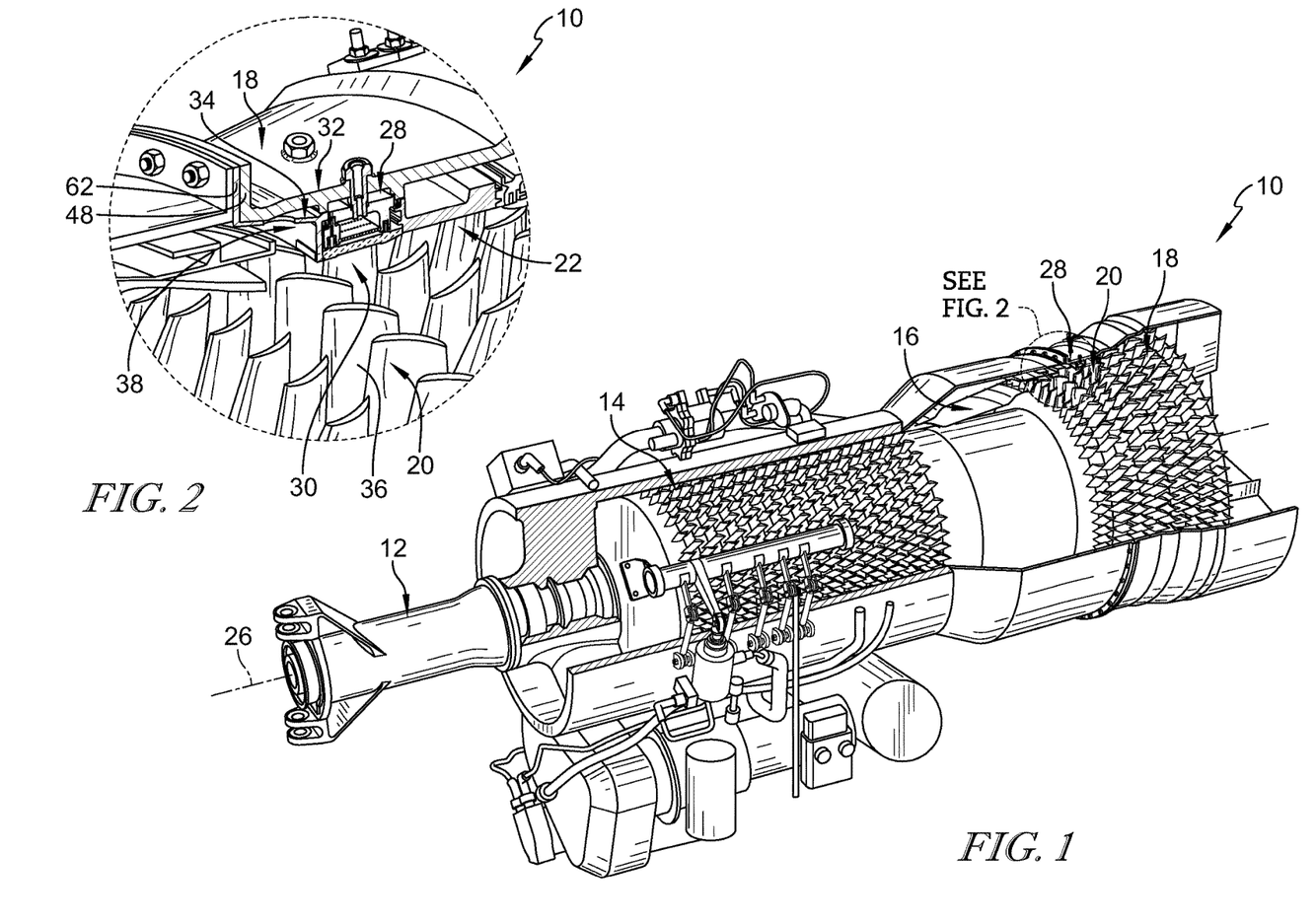
FIG. 1 is a cut-away perspective view of a gas turbine engine having a turbine section in accordance with the present disclosure.
FIG. 2 is a detail view of FIG. 1 showing that the turbine section includes a rotating turbine wheel assembly and a turbine shroud arranged around the rotating turbine wheel assembly to provide a path for gasses to flow through the turbine.

An illustrative gas turbine engine 10 includes an output shaft 12, a compressor 14, a combustor 16, and a turbine 18 as shown in FIG. 1. The output shaft 12 is configured to drive a propeller, fan, or gearbox and is powered by the turbine 18. The compressor 14 compresses and delivers air to the combustor 16. The combustor 16 mixes fuel with the compressed air received from the compressor 14 and ignites the fuel. Hot combustion products of the combustion reaction in the combustor 16 are directed into the turbine 18 and the turbine 18 extracts work to drive the compressor 14 and the output shaft 12.

The turbine 18 includes a rotating turbine wheel assembly 20, a static turbine vane assembly 22, and a turbine shroud 28 as shown in FIGS. 1 and 2. The rotating turbine wheel assembly 20 is pushed by the hot high-pressure combustion products formed in the combustor 16 to cause the rotating turbine wheel assembly 20 to rotate about a central axis 26 of the engine 10; thereby driving the compressor 14 and the output shaft 12. The vane assembly 22 is configured to direct the combustion products into another turbine wheel assembly located downstream of the vane assembly 22. The turbine shroud 28 is arranged around the rotating turbine wheel assembly 20 to define a gas path for the combustion products.

Figure 3:
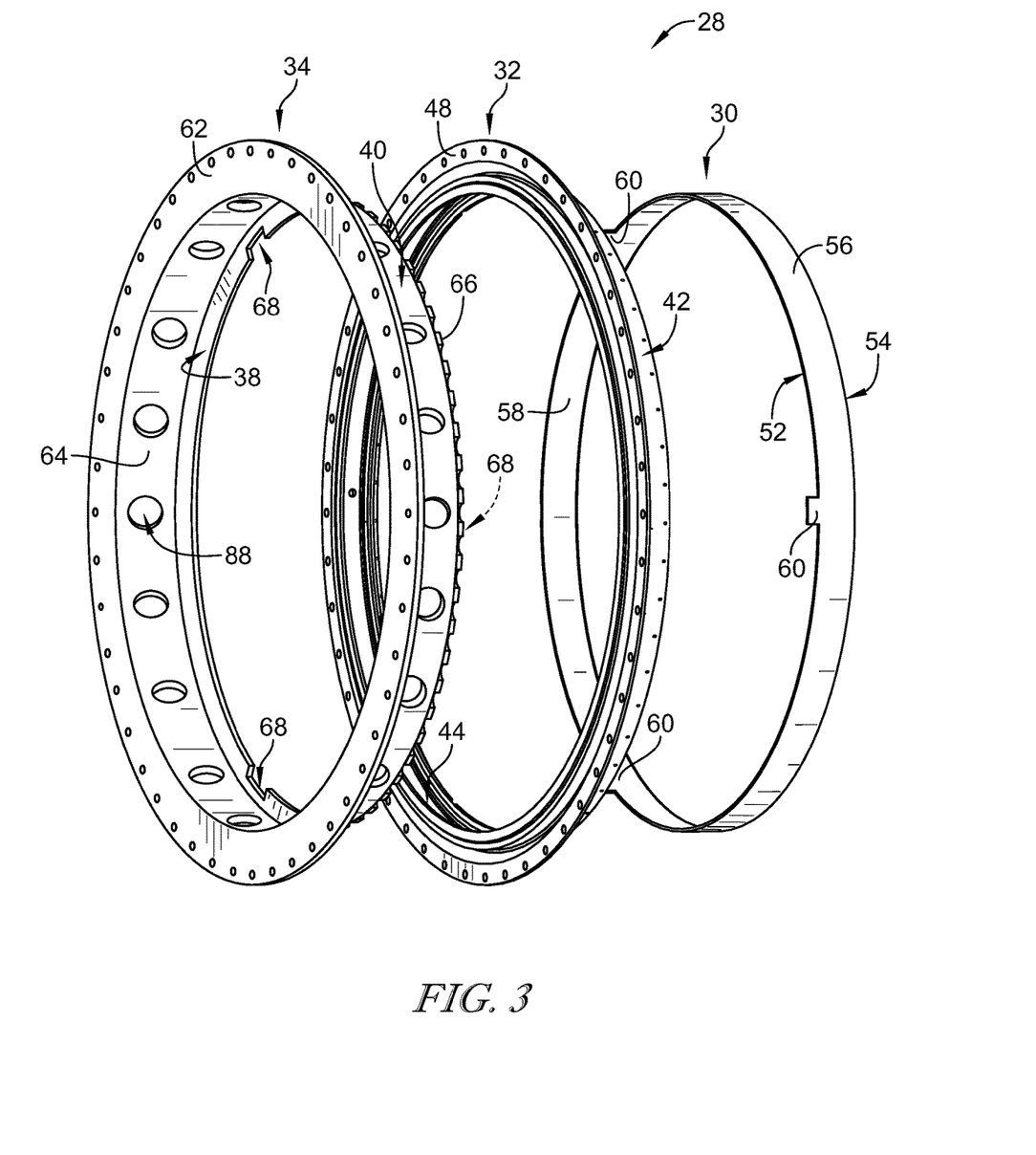
FIG. 3 is an exploded view of the turbine shroud of FIG. 1 showing that the turbine includes, from right to left, a full hoop blade track arranged around a central axis of the engine, a turbine case arranged to extend around the blade track, and a forward case configured to couple to the turbine case and locate the blade track axially relative to the turbine case.
Figure 4:
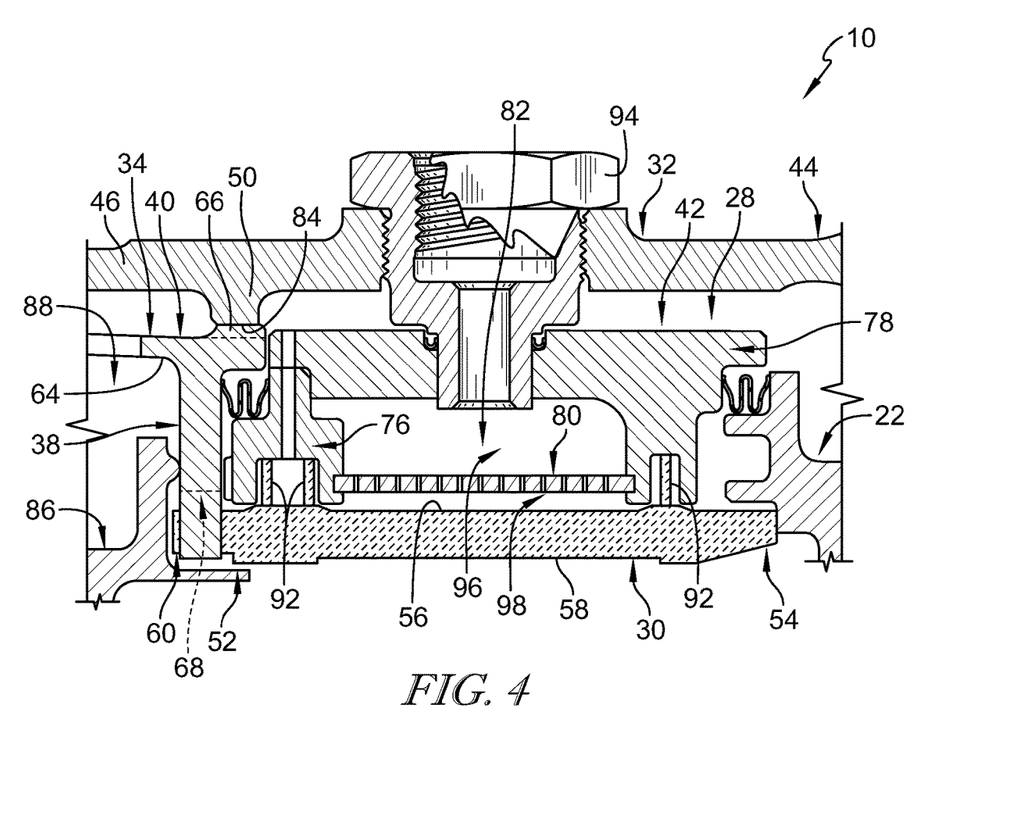
FIG. 4 is a cross-sectional view of the turbine of FIG. 2 showing that the forward case is coupled to the turbine case and that the forward case interlocks with a leading edge of the blade track to locate the blade track axially and circumferentially while allowing radial movement between the blade track and the turbine case.

The illustrative turbine shroud 28 includes a blade track 30, a support assembly 32 arranged around the blade track 30, and a forward case 34 as shown in FIGS. 3 and 4. The blade track 30 is arranged around blades 36 included in the rotating turbine wheel assembly 20 to block combustion products from passing over the blades 36. The support assembly 32 is arranged to support the blade track 30 about the central axis 26. The forward case 34 interlocks with the blade track 30 to locate the blade track 30 relative to the support assembly 32 by blocking axial and circumferential movement of the blade track 30 relative to the support assembly 32 while allowing radial growth between the blade track 30 and the support assembly 32 as suggested in FIG. 4.

In the illustrative embodiment, the forward case 34 includes a locator flange 38 that interlocks with the blade track 30 and an axial runner 40 that couples the forward case 34 to the support assembly 32 as shown in FIGS. 2-4. The locator flange 38 extends radially inwardly toward the central axis 26 and is formed to include a plurality of radially outwardly extending cutouts 68 as shown in FIG. 3. The locator flange 38 includes an outer radial end coupled to the axial runner 34 and an inner radial end spaced apart radially from the outer radial end. The cutouts 68 extend radially outwardly into the inner radial end of the locator flange 38 toward the outer radial end.

Each cutout 68 receives a corresponding tang 60 formed in a leading edge 52 of the blade track 30 as shown in FIG. 4. The locator flange 38 is configured to contact the tangs 60 and the leading edge 52 of the blade track 30 to block axial forward movement and circumferential movement of the blade track 30 relative to the support assembly 32 while allowing the blade track 30 to move radially in and out in the cutouts 68 to allow for radial thermal-growth.

The support assembly 32 illustratively includes a carrier 42, a turbine case 44, and the vane assembly 22 as shown in FIG. 4. The carrier 42 is an annular, round metallic component that is configured to support the blade track 30 in position adjacent the blades 36 of the turbine wheel assembly 20. The turbine case 44 extends around the carrier 42 and supports the carrier 42 and the blade track 30 relative to the central axis 26. The vane assembly 22 is arranged to position the blade track 30 axially relative to other static turbine components in the turbine 18.

The turbine case 44 includes a case body 46, a forward mount 48, and an aft mount 50 as shown in FIGS. 3 and 4. The case body 46 extends axially along the central axis 26 and is formed to include pin receivers arranged to receive a plurality of cross-key pins 94. The forward mount 48 is coupled to the case body 46 and extends radially outwardly away from the case body 46 as shown in FIG. 2. The aft mount 50 is spaced apart axially from the forward mount 48 and extends radially inwardly toward the central axis 26. In the illustrative embodiment, the forward mount 48 is formed to include a plurality of holes sized to receive fasteners to couple the forward mount 48 to the forward case 34. In some embodiments, the aft mount 50 is discontinuous. For example, in some embodiments, the aft mount 50 includes radially extending scallops as suggested in FIG. 5.

The illustrative blade track 30 is concentric with and nested into the support assembly 32 along the central axis 26 of the engine 10 as shown in FIG. 4. In the illustrative embodiment, the blade track 30 is a unitary component forming a full hoop. The blade track 30 is a component of one-piece, continuous construction, rather than as a series of joined segments. This construction eliminates gaps that may be formed between parts of a multi-piece (or segmented) blade track. In the illustrative embodiment, the blade track 30 comprises ceramic matrix composite materials.

The blade track 30 includes a leading edge 52, a trailing edge 54, a radial outer surface 56, and a radial inner surface 58 as shown in FIG. 4. The leading edge 52 is located toward a forward end of the gas turbine engine 10. The trailing edge 54 is axially spaced apart from the leading edge 52 toward an aft end of the engine 10. The radial outer surface 56 extends between the leading edge 52 and the trailing edge 54. The radial inner surface 58 is radially spaced apart from the radial outer surface 56 to locate the radial inner surface 58 radially between the radial outer surface 56 and the central axis 26.

Illustratively, the leading edge 52 of the blade track 30 is formed to include a plurality of tangs 60 as shown in FIGS. 3 and 4. The tangs 60 extend axially forward away from the trailing edge 54 toward the forward case 34. The tangs 60 extend through the forward case 34 to interlock the blade track 30 with the forward case 34 as suggested in FIG. 4.

The forward case 34 includes the axial runner 40 and the locator flange 38 as shown in FIGS. 3 and 4. The axial runner 40 extends axially between a first and second end of the forward case 34 as shown in FIGS. 3 and 4. The axial runner 40 is coupled to the forward mount 48 and the aft mount 50 of the turbine case 44. The locator flange 38 interlocks with the tangs 60 of the blade track 30 to block relative circumferential and axial movement between the blade track and the support assembly 32.

The axial runner 40 includes a mount flange 62, a band 64, and a shoulder 66. The band 64 extends axially between the first and second ends of the forward case 34 and radially about the central axis 26. The mount flange 62 extends radially outwardly away from the band 64 and couples to the forward mount 48 of the turbine case 44. Illustratively, fasteners extend through the mount flange 62 and the forward mount 48 of the turbine case 44 to couple the forward case 34 to the turbine case 44 as shown in FIG. 2. The shoulder 66 is spaced axially apart from the mount flange 62 and engages a radial inner surface 84 of the aft mount 50 of the turbine case 44.

Illustratively, the band 64 is arranged to flex/plastically deform in response to being coupled to the turbine case 44 at the forward and aft ends of the forward case 34. For example, the band 64 may flex if a distance between the mount flange 62 and the shoulder 66 is greater than a distance between the forward and aft mounts 48, 50 of the turbine case 44. As such, the position of the locator flange 38 may be adjusted axially along the central axis 26 relative to the turbine case 44 and the blade track 30 for a range of forward case lengths.

In the illustrative embodiment, the band 64 is formed to include a plurality of apertures 88 as shown in FIG. 3. The apertures 88 allow air to flow through the forward case 34. The apertures 88 may help the band 64 flex/plastically deform. The apertures 88 extend radially through the band 64 and are arranged circumferentially about the central axis 26. In the illustrative embodiment, the apertures 88 are axially aligned with one another.

The shoulder 66 extends radially outwardly away from the band 64 and is press-fitted to the aft mount 50 of the turbine case 44 to couple the forward case 34 to the turbine case 44. As such, an outer diameter of the shoulder 66 is greater than an inner diameter of the turbine case 44 at the aft mount 50. By press-fitting the shoulder 66 to the turbine case 44, the axial position of the locator flange 38 can be adjusted to position the locator flange 38 relative to the turbine case 44 to locate the blade track 30 in a desired axial position.

Illustratively, the shoulder 66 is discontinuous to allow airflow between the shoulder 66 and the turbine case 44. The shoulder 66 is scalloped in the illustrative embodiment. The discontinuous shoulder 66 may help avoid high press-fit stresses while maintaining contact with the turbine case 44 throughout the temperatures of the operating envelope of the gas turbine engine 10.

The locator flange 38 is coupled to the band 64 of the axial runner 40 as shown in FIG. 4. The locator flange 38 extends radially inwardly away from the turbine case 44 toward the central axis 26. The locator flange 38 is formed to include a plurality of cutouts 68 that extend radially outwardly into the locator flange 38. Each cutout 68 receives a corresponding tang 60 of the blade track 30 so that the leading edge 52 of the blade track is adjacent or engaged with the locator flange 38 as shown in FIG. 4. As such, the locator flange 38 blocks forward axial movement of the blade track 30 relative to the support assembly 32. The tangs 60 are interlocked with the locator flange 38 so that the locator flange 38 blocks circumferential rotation of the blade track 30 relative to the support assembly 32.

The cutouts 68 are sized to allow for radial growth of the blade track 30 as suggested in FIG. 4. For example, the blade track 30 may grow radially outwardly relative to the support assembly 32 due to the heat of the turbine 18 to cause the tangs 60 to move radially outwardly in the cutouts 68. As another example, the support assembly 32 and the forward case 34 may grow radially outwardly relative to the blade track 30 due to the heat of the turbine 18. As yet another example, the blade track 30 may be cooled using cooling air to cause the blade track 30 to shrink radially inwardly to reduce a clearance gap between the radial inner surface 58 of the blade track 30 and the tips of the blades 36.

In the illustrative embodiment, the locator flange 38 includes three cutouts 68 and the blade track 30 includes three tangs 60. In other embodiments, the locator flange 38 and the blade track 30 may include more or less than three cutouts 68 and tangs 60 respectively.

Alternative locating features used with some turbine shrouds include blade tracks with clocking features that extend radially outwardly away from the radial outer surface of the blade track. The clocking features may interlock with the support assembly to block circumferential movement of the blade track. Such clocking features may cause the blade track to be relatively thick or to have a buildup of material on the radial outer side. As a result, such blade tracks may be heavier, may be difficult to manufacture within tolerances, and may have reduced thermal properties as compared to the blade track 30 of the present disclosure. For example, the additional material may cause alternative blade tracks to respond slowly to cooling air so that tip clearance performance is reduced.

Because the forward case 34 interlocks with the leading edge 52 of the blade track 30, the blade track 30 may be located relative to the support assembly 32 without radially extending clocking features. As a result, the blade track 30 may have a relatively thin and uniform thickness between the radial outer surface 56 and the radial inner surface 58 of the blade track 30 as suggested in FIG. 4. The relatively thin black track 30 may respond relatively quickly to cooling air to allow for greater tip clearance control. The illustrative radial outer surface 56 of the blade track 30 is generally cylindrical without protrusions or depressions. For example, alternative blade tracks 30 may include alignment features such as protrusions or depressions.

In illustrative embodiments, the one-piece full hoop of the blade track 30 encourages uniform radial expansion of the blade track 30 at high temperatures. Uniform radial expansion of the blade track 30 allows the blade track 30 to remain round at high temperatures which results in the ability to further maintain a small gap between the blades 36 and the blade track 30 while hot combustion products are being directed over the blades 36 and the blade track 30.

The blade track 30 is illustratively made from a ceramic material; and, more particularly, a ceramic matrix composite (CMC) including silicon carbide fibers and silicon carbide matrix. The blade track 30 has a relatively low coefficient of thermal expansion because of its composition. Considering the relatively small coefficient of thermal expansion, the blade track 30 can be designed to maintain a small gap between the blade track 30 and the blades 36 thereby improving performance of the engine 10.

In the illustrative embodiment, the carrier 42 includes a forward support 76, an aft support 78, and an impingement plate 80 as shown in FIG. 4. The forward support 76 is configured to conduct cooling air toward the leading edge 52 of the blade track 30. The aft support 78 is formed to include a plurality of apertures and each aperture is configured to receive a cross-key pin 94 that extends through the turbine case 44 into the aft support 78 as shown in FIG. 4. The cross-key pins 94 locate the carrier 42 axially and circumferentially relative to the central axis 26 and conduct pressurized air into the carrier 42. In the illustrative embodiment, the forward and aft supports 76, 78 include piston ring seals 92 positioned between the carrier 42 and the radial outer surface 56 of the blade track 30.

The forward and aft supports 76, 78 cooperate to define a thermal management chamber 82 that is configured to receive cooling air such as, for example, pressurized air from the compressor 14. The impingement plate 80 extends between the forward and aft supports 76, 78 to partition the thermal management chamber 82 into a radial outer distribution cavity 96 and a radial inner cooling cavity 98.

Pressurized air is conducted through the cross-key pins 94 in the turbine case 44 into the distribution cavity 96 as suggested in FIG. 4. The distribution cavity 96 is configured to distribute the pressurized air circumferentially around the central axis 26 to cause the air in the thermal management chamber 82 to have a generally uniform pressure. The impingement plate 80 is formed to include a plurality of holes arranged to direct the pressurized air out of the distribution cavity 96 into the cooling cavity 98 toward a radial outer surface 56 of the blade track 30 to cool the blade track 30.

Figure 5:
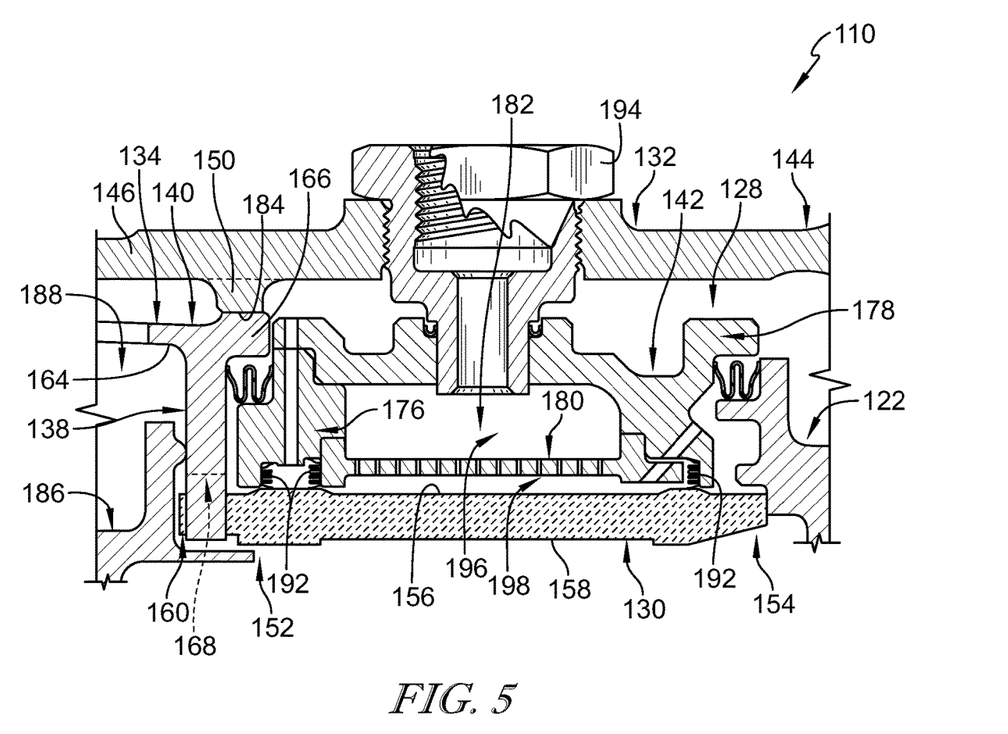
FIG. 5 is a cross-section view of another embodiment of a turbine shroud for use in the gas turbine engine of FIG. 1.

In some embodiments, the forward and aft supports 76, 78 are formed to include slots that extend axially into the supports 76, 78 and extend circumferentially about the central axis 26 as shown in FIG. 4. The slots are arranged to receive the impingement plate 80. In some embodiments, the forward and aft supports 76, 78 are formed to include cutouts that extend circumferentially about the central axis 26. The cutouts are arranged to receive the impingement plate 80 as shown in FIG. 5. In some embodiments, the impingement plate 80 is brazed to one or more of the forward and aft supports 76, 78.

The vane assembly 22 is positioned aft of the blade track 30 and engages the blade track 30 to block axial aft movement of the blade track 30 relative to the carrier 42 and the turbine case 44 as shown in FIG. 4. The illustrative vane assembly 22 includes an airfoil shaped body configured to receive air from the blades 36 of the rotating wheel assembly 20 and to direct the air into another set of blades located downstream of the vane assembly 22.

The illustrative turbine 18 further includes nozzle guide vanes 86 (sometimes called NGV 86) adapted to engage the forward case 30 as shown in FIG. 4. The nozzle guide vanes 86 may be adapted to direct the combustion products into the turbine blades 36 at a desired angle and to regulate flow through the vanes 86. Illustratively, the nozzle guide vanes 86 transmit axial loads through the forward case 30 so that the forward case 30 carries the axial loads of the nozzle guide vane 86. As a result, axial loads from the nozzle guide vane 86 acting on the blade track 30 are reduced or eliminated to allow the blade track 30 to be free to move radially inwardly and outwardly relative to the turbine case 46. In the illustrative embodiment, the blade track 30 is axially spaced apart from the nozzle guide vanes 86.

Another illustrative turbine shroud 128 adapted for use in a gas turbine engine is shown in FIG. 5. The turbine shroud 128 is substantially similar to the turbine shroud 28 shown in FIGS. 1-4 and described herein. Accordingly, similar reference numbers in the 100 series indicate features that are common between the turbine shroud 28 and the turbine shroud 128. The description of the turbine shroud 28 is hereby incorporated by reference to apply to the turbine shroud 128, except in instances when it conflicts with the specific description and drawings of the turbine shroud 128.

The aft mount 150 of the turbine case 144 is discontinuous to allow airflow between the turbine case 144 and the forward case 134 as shown in FIG. 5. Illustratively, the aft mount 150 is scalloped.

The forward support 176 and the aft support 178 are formed to include cutouts that extend radially into the forward and aft supports 176, 178 to receive the impingement plate 180. In some embodiments, the impingement plate 180 is brazed with the forward and aft supports 176, 178. The cutouts may allow for easier assembly of the carrier 132. The forward and aft supports 176, 178 further include E-seals 192 positioned between the carrier 132 and the radial outer surface 156 of the blade track 130.

Some gas turbine engines include metallic blade tracks. A relatively large amount of cooling may be needed to maintain structural properties of the metallic blade tracks such as, for example, as the overall pressure ratio and gas path temperatures increase. The metallic blade track may be replaced with a ceramic matrix composite blade track and the apparatus and methods for retaining the ceramic matrix composite blade track as disclosed herein. As an example, the forward case 34 locates on the turbine case 44 and provides a cross-key feature with the leading edge 52 of the blade track 30.

The forward case 34 may improve engine cycle with less cooling air extracted from the compressor 14. The forward case 34 avoids cross-key pockets formed in the blade track 30 which may cause stress risers and may make the blade track relatively thicker and more difficult to cool. Relatively thin ceramic matrix composite blade tracks may be easier to manufacture to tolerance.

In one embodiment, a turbine assembly includes the turbine case 44, the carrier 42, the blade track 30, and the forward case 34 as shown in FIG. 4. The blade track 30 is attached to the forward case 34 through a series of cross-keys. In the illustrative embodiment, the blade track 30 is pressure loaded aft and rests against the downstream turbine vane assembly 22. The blade track 30 is allowed to float radially in and out as temperatures in the turbine 18 increase and decrease. The fabrication of the blade track 30 may be relatively simple as the blade track 30 is fabricated as a simple ring. A series of machined tangs 60 protrude from the forward end of the blade track 30. The tangs 60 are captured by a series of intermittent tangs protruding from the inner diameter of the forward case 34.

The carrier 42 includes the forward support 76, the aft support 78, and the impingement plate 80. The impingement plate 80 is captured between the aft support 78 and the forward support 76 of the carrier 42. In some embodiments, a braze joint exists between the forward support 76 and the aft support 78. In some embodiments, the impingement plate 80 may be brazed at either end or at both ends to the aft support 78 and/or to the forward support 76.

Illustratively, the carrier 42 is retained through a series of cross-key pins 94 that protrude through the turbine case 44 and into the aft support. The cross-key pins 94 are threaded into the turbine case 44 in the illustrative embodiment and include a passage that allows for an air fitting to be installed. The air fitting allows high pressure bleed air to be routed into the chamber 82, through the impingement plate 80, and onto the radial outer surface 56 of the blade track 30.

In other embodiments, the impingement plate 80 is reconfigured to account for the ease of assembly of E-seals 192. The E-seal 192 is installed into the aft support 78 prior to pressing of the impingement plate 80 into the assembly. Additional E-seals 192 may be installed into the forward support 76 prior to installation of the forward support 76 onto the aft support/impingement plate assembly. In some embodiments, piston ring type seals 92 are used in place of E-seals 192. In some embodiments, the piston ring seals 92 are made of ceramic matrix composite material.

The present disclosure provides a forward case 34 (sometimes called a forward support 34) that carries nozzle guide vane load provides cross-keying near the leading edge of the blade track 30. Illustratively, the forward support 34 is located via a press fit to the turbine case 44 radially outboard of the cross-key feature. In some embodiments, one of the turbine case 44, forward support 34, or both includes a discontinuous press-fit diameter to avoid high press-fit strain while maintaining contact throughout a temperature range of the entire operating envelope. The discontinuous interface may be used to allow air to flow across the cross-key flange of the forward support 34 from one side to the other.

In some embodiments, the forward support 34 is formed to include relatively large holes 88 in the forward case axial runner 40 for structural and flow system reasons. The holes may provide flexibility for the cross-key flange to follow the centerline of the turbine case 44. The holes 88 may reduce weight and the holes may allow air to flow from one side of the forward support to the other to enable an air-system.

The cross-keying may avoid back side geometry on the blade track 30 such as, for example, radial cross-key counter bores which may have a negative effect on thermal management and tip clearance control. The cross-key feature may allow for thinner ceramic matrix composite blade tracks due to the elimination of pin cross-key counter bores on the back side of the blade track. Thinner blade tracks may be used to optimize the engine. For example, thermal response could be traded with weight which could be traded with thermal gradients and thermal stresses. A thinner blade track may be easier to produce without out of round issues.

The turbine assembly may provide good alignment between the turbine case centerline and the blade track centerline to minimize tip clearance stack ups. The discontinuous press-fit between the forward support and the turbine case may reduce stresses, allow for more differential thermal growth, and would allow for air to pass to the cavity above the carrier. The relatively large holes in the forward case axial runner may allow compressor discharge air to pass to the outer cavities for reduced stress on the forward support and for failure mode management of the seal segment. These holes may reduce the stiffness with respect to differential thermal growth between the front mounting flange and the management of the seal segment. The holes may reduce the stiffness with respect to differential thermal growth between the front mounting flange and the cross-key flange.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for a gas turbine engine, the turbine shroud assembly comprising
an annular turbine case arranged around a central axis of the turbine shroud assembly,
a full hoop blade track comprising ceramic matrix composite materials located radially between the turbine case and the central axis, the blade track having a leading edge and a trailing edge axially spaced apart from the leading edge, and
a forward case coupled to the turbine case and arranged to extend radially inwardly away from the turbine case toward the central axis and interlocked with the leading edge of the blade track to block circumferential and axial movement of the blade track relative to the turbine case while allowing radial movement of the blade track relative to the turbine case,
further comprising a carrier located radially between the turbine case and the blade track and a hollow cross-key pin that extends through the turbine case into the carrier, the carrier is arranged to define an inwardly facing thermal management chamber, and the hollow cross-key pin is configured to direct airflow through the turbine case and the carrier into the thermal management chamber toward the blade track.

2. The turbine shroud assembly of claim 1, wherein the forward case includes an axial runner that extends from a first end to a second end axially spaced from the first end and a locator flange coupled to the axial runner toward the second end, the locator flange extends radially inwardly away from the turbine case toward the central axis, and the locator flange interlocks with the leading edge of the blade track.

3. The turbine shroud assembly of claim 2, wherein the locator flange is formed to include a plurality of cutouts that extend radially outwardly into the locator flange, the leading edge of the blade track is formed to include a plurality of tangs that extend axially forward away from the trailing edge of the blade track toward the locator flange, and each tang is received by one of the cutouts formed in the locator flange of the forward case to interlock the forward case and the blade track.

4. The turbine shroud assembly of claim 3, wherein the blade track includes a radial outer surface that faces the turbine case and a radial inner surface radially spaced apart from the radial outer surface and the radial outer surface of the blade track is generally cylindrical without protrusions and depressions.

5. The turbine shroud assembly of claim 3, wherein the plurality of cutouts formed in the locator flange includes at least three cutouts and the plurality of tangs formed in the leading edge of the blade includes at least three tangs.

6. The turbine shroud assembly of claim 2, wherein the axial runner is formed to define a plurality of apertures that extends radially through the axial runner.

7. The turbine shroud assembly of claim 1, wherein the forward case includes a first end, a second end axially spaced apart from the first end, an axial runner that extends between the first and second ends, and a locator flange that extends radially inwardly away from the axial runner toward the central axis, the axial runner includes a band that extends between the first and second ends of the forward case, a mount flange that extends radially outwardly away from the band at the first end of the forward case, and a shoulder that extends radially outwardly away from the band at the second end of the forward case.

8. The turbine shroud assembly of claim 7, wherein the turbine case includes a forward mount and an aft mount spaced apart axially from the forward mount, the aft mount includes a radial inner surface that faces the central axis, and the shoulder of the axial runner has an outer diameter that is larger than an inner diameter of the radial inner surface of the aft mount.

9. The turbine shroud assembly of claim 7, wherein the shoulder is formed to include radially extending scallops arranged to allow air flow between the shoulder and the turbine case.

10. A turbine assembly for a gas turbine engine, the turbine assembly comprising
an annular turbine case arranged around a central axis of the turbine assembly,
a blade track located radially between the turbine case and the central axis, the blade track having a leading edge and a trailing edge axially spaced apart from the leading edge,
a vane assembly located radially between the turbine case and the central axis and located axially aft of the blade track, the vane assembly arranged to engage the trailing edge of the blade track to block axially aft movement of the blade track relative to the turbine case, and
a forward case coupled to the turbine case and arranged to interlock with the leading edge of the blade track to block circumferential and forward axial movement of the blade track relative to the turbine case while allowing radial movement of the blade track relative to the central axis,
wherein the forward case includes an axial runner that extends from a first end to a second end axially spaced from the first end and a locator flange coupled to the axial runner toward the second end, the locator flange extends radially inwardly away from the turbine case toward the central axis, the locator flange is formed to include a cutout that extends radially outwardly into the locator flange, the leading edge of the blade track is formed to include a tang that extends axially into the cutout to interlock the forward case and the blade track,
wherein the turbine case includes a radially inwardly extending aft mount, the axial runner includes an annular band that extends from a first end to a second end of the band, a mount flange that extends radially outwardly away from first end of the band, and a shoulder that extends radially outwardly away from the second end of the band, and the shoulder engages the aft mount of the turbine case.

11. The turbine assembly of claim 10, wherein the axial runner includes a band and a mount flange that extends radially outwardly away from the band and the band is formed to include a plurality of radially extending apertures spaced apart from one another circumferentially about the central axis.

12. The turbine assembly of claim 10, further comprising nozzle guide vanes located radially between the turbine case and the central axis and located axially forward of the blade track and the nozzle guide vanes engage the forward case to transmit axial loads through the forward case.

13. The turbine assembly of claim 10, wherein the shoulder is discontinuous.

14. The turbine assembly of claim 10, further comprising a carrier located radially between the turbine case and the blade track and a hollow cross-key pin that extends through the turbine case into the carrier, the carrier is arranged to define an inwardly facing thermal management chamber, and the hollow cross-key pin is configured to direct airflow through the turbine case and the carrier into the thermal management chamber toward the blade track.

15. A method of assembling a turbine assembly for use in a gas turbine engine, the method comprising
providing an annular turbine case arranged around a central axis of the gas turbine engine, a full hoop blade track having a leading edge and a trailing edge axially spaced apart from the leading edge, a forward case having an axially extending axial runner and a radially inwardly extending locator flange, a carrier arranged to define an inwardly facing thermal management chamber, and a hollow cross-key pin,
locating the carrier radially between the turbine case and the blade track so that the inwardly facing thermal management chamber is aligned axially with the blade track,
extending the hollow cross-key pin through the turbine case into the carrier such that the hollow cross-key pin is configured to direct airflow through the turbine case and the carrier into the thermal management chamber toward the blade track,
fastening the axial runner of the forward case to the turbine case, and
interlocking the leading edge of a blade track with the locator flange of the forward case.

16. The method of claim 15, further comprising press-fitting the axial runner of the forward case to the turbine case.

17. The method of claim 16, wherein the locator flange is formed to include a cutout and the leading edge of the blade track is formed to include a tang that extends axially away from the trailing edge of the blade track toward the forward case and the step of interlocking the leading edge of the blade track with the locator flange of the forward case includes the steps of aligning circumferentially the tang of the blade track with the cutout formed in the locator flange and moving the blade track axially toward the locator flange to cause the cutout to receive the tang.

18. The method of claim 15, wherein the axial runner extends from a first end to a second end axially spaced from the first end and the locator flange is coupled to the axial runner toward the second end, the locator flange extends radially inwardly away from the turbine case toward the central axis, the locator flange is formed to include a cutout that extends radially outwardly into the locator flange, the leading edge of the blade track is formed to include a tang that extends axially into the cutout to interlock the forward case and the blade track, and wherein the turbine case includes a radially inwardly extending aft mount, the axial runner includes an annular band that extends from a first end to a second end of the band, a mount flange that extends radially outwardly away from first end of the band, and a shoulder that extends radially outwardly away from the second end of the band, and the shoulder engages the aft mount of the turbine case.

* * * * *